Feb. 13, 1934.   J. F. PARKER, JR., ET AL   1,946,985
BLOOD PRESSURE REGISTERING MACHINE
Filed Aug. 21, 1930   6 Sheets-Sheet 1

INVENTORS
James F. Parker Jr.
James L. Parker
BY
Victor J. Evans
ATTORNEY

Feb. 13, 1934.  J. F. PARKER, JR., ET AL  1,946,985
BLOOD PRESSURE REGISTERING MACHINE
Filed Aug. 21, 1930   6 Sheets-Sheet 2
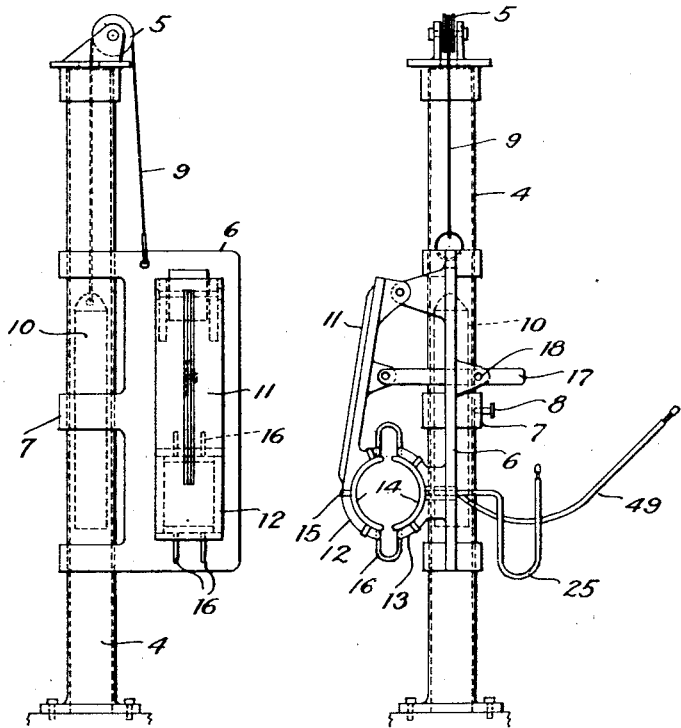
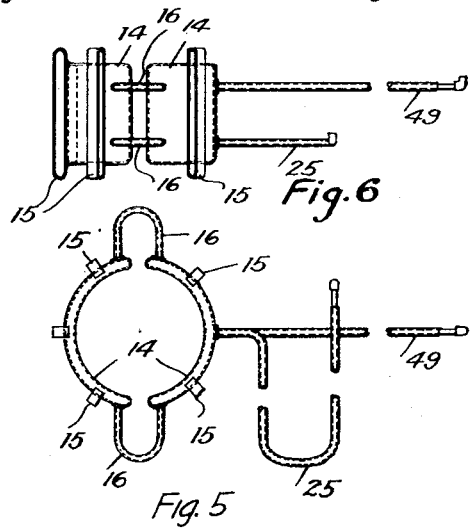
INVENTORS
*James F. Parker Jr*
*James L. Parker*
BY
*Victor J. Evans*
ATTORNEY

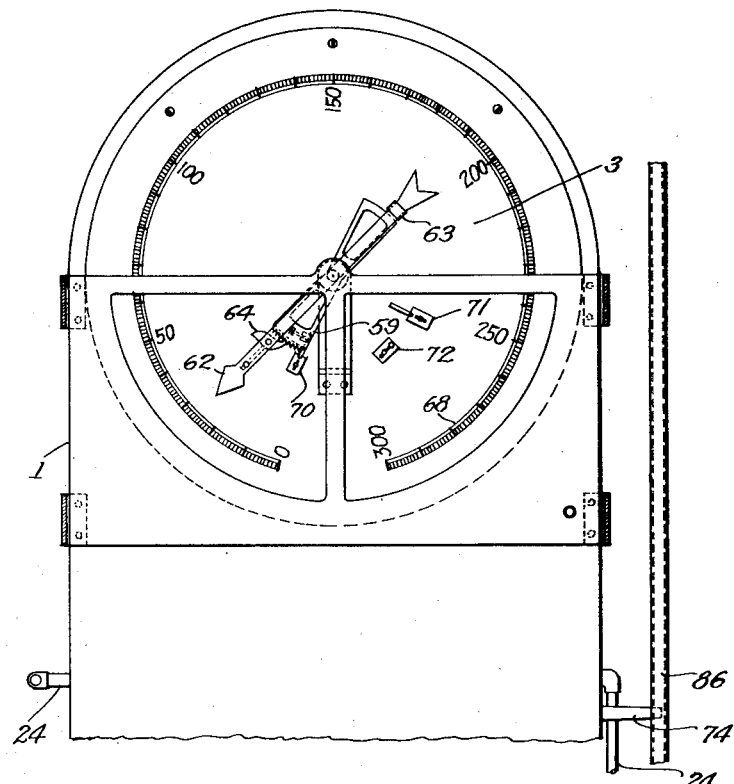
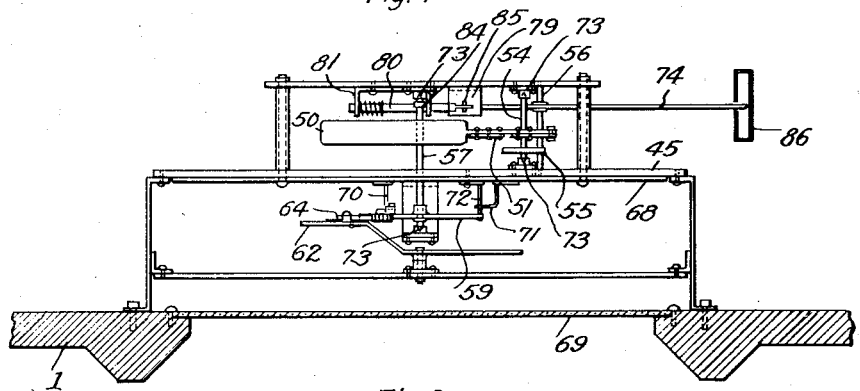

Feb. 13, 1934.     J. F. PARKER, JR., ET AL     1,946,985
BLOOD PRESSURE REGISTERING MACHINE
Filed Aug. 21, 1930     6 Sheets-Sheet 5

INVENTORS
James F. Parker Jr.
James L. Parker
BY
Victor J. Evans
ATTORNEY

Patented Feb. 13, 1934

1,946,985

UNITED STATES PATENT OFFICE 1,946,985

BLOOD PRESSURE REGISTERING MACHINE

James F. Parker, Jr., Raleigh, N. C., and James L. Parker, Charleston, S. C.

Application August 21, 1930. Serial No. 476,745

8 Claims. (Cl. 73—44)

The principal object of this invention is an improvement in devices for registering blood pressure, thereby eliminating the need for expert manipulation and observation and avoiding the possibility of errors that may enter through the personal equation of the observer.

A further object of the invention is a self-registering device for measuring blood pressure, which shall be operable automatically by the incertion of a coin in a slot.

The purpose of this invention is a machine that will permit any individual of average intelligence to measure and observe his own blood pressure by reading on a dial the figure to which a needle points fixedly and immovably.

The machine is intended to measure or indicate systolic blood pressure and wherever pressure is referred to hereinafter, it is intended to apply to systolic blood pressure.

In describing the invention in detail, reference will be had to the accompanying drawings wherein like characters denote like or corresponding parts throughout the several views, and in which:—

Figure 3 is a front elevation of the standard and hinged frame carrying the adjustable rubber arm band.

Figure 4 is a side view of Figure 3.

Figure 5 is a view of the rubber arm band and its connecting tubing.

Figure 6 is a top plan view of Figure 5.

Figure 7 is a front elevation of the dial and indicator, with the mechanical control.

Figure 8 is a horizontal sectional view of the structure of Figure 7 substantially in the plane of the axis of the indicator.

Figure 2:
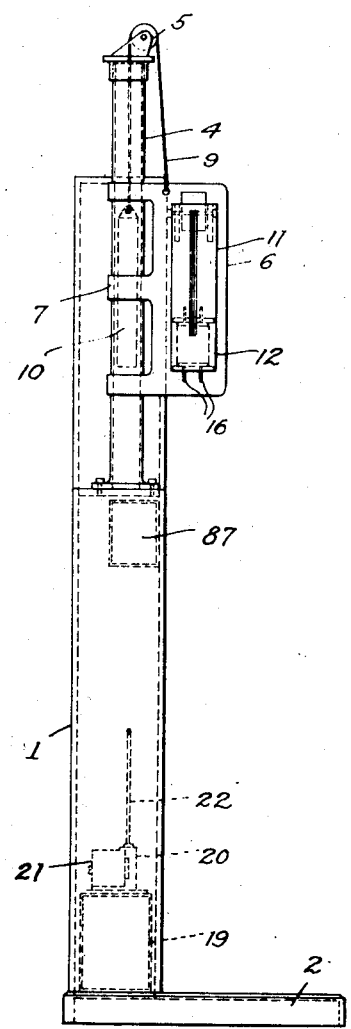
Figure 2 is a side view of the same.
Figure 1:
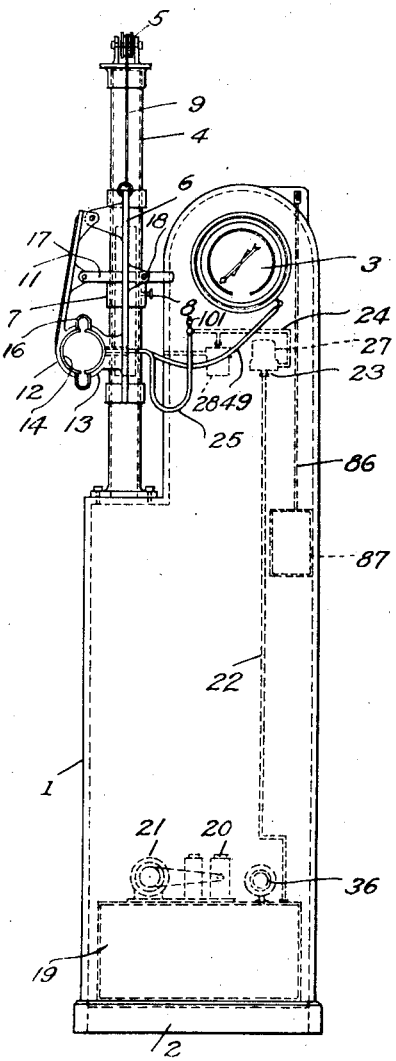
Figure 1 is a front elevation of the machine.

In these drawings, the numeral 1 indicates a cabinet and the numeral 2 the base thereof, the base being extended forwardly to provide a platform on which a person stands when using the machine. The cabinet is provided with a reduced upper part having a circular window 3 in its upper end and at the junction of this reduced part with the major part of the cabinet, a horizontal portion is formed to which is bolted or otherwise fastened a tubular upright or post 4 having a pulley 5 at its upper end. A frame 6 is supported for sliding movement on the post by means of the circular parts 7 passing around the post and one of these circular parts carries a set screw 8 for engaging the post to hold the frame in adjusted position. A cable 9 is attached to the top part of the frame and passes upwardly over the pulley and then downwardly into the post, where it is attached to a weight 10 which acts as a counterbalance for the frame.

An arm 11 is pivoted at its upper end to the frame and has a semi-circular part 12 at its lower end which is opposite a semi-circular part 13 extending horizontally from the frame 6. A semi-circular bag 14 of rubber is attached to each of the parts 12 and 13 by the bands 15 which are attached to the bag and encircle the semi-circular part and the two bags are connected together at their ends by the tubes 16, also of rubber. A bar 17 is pivoted to an intermediate part of the arm 11 and passes through a slot formed in the frame 6 and is held in adjusted position in said slot by means of the set screw 18. Thus a person standing on the platform can pass his arm through the circular space formed by the bags 14, after baring his arm, and then by adjusting the arm 11 by means of the bar 17, he can cause the bags to fit snugly around his arm. Of course, after the arm 11 has been adjusted, the set screw 18 is tightened to hold the parts in adjusted position.

A tank 19 is arranged in the bottom part of the cabinet and a compressor 20 is supported by the tank and said compressor is driven by an electric motor 21, also supported from the tank, the compressor being suitably connected with the tank so that the air from the compressor will enter the tank.

A pipe 22 extends upwardly from the tank and has its upper end connected with a valve casing 23 supported in the upper portion of the cabinet and a pipe 24 connects the outlet of the valve casing with a tube 25 which is connected with the bag 14 carried by the part 13 on the post, so that air from the tank will enter the bags when the valve 26 in the casing 23 is opened. This valve 26 is normally held closed by a spring or any other suitable means and it is moved to open position when a solenoid 27 is energized, as the valve is connected with the core of the solenoid.

A valve, operated by a solenoid, is shown generally at 28, and this valve is normally held in open position and is closed when the solenoid is energized. A pipe 29 connects the casing of this valve with the pipe 24 and the outlet of the casing is connected by a pipe 30 with a hole 31 in the cabinet.

Conductors 32 are connected to any suitable source of supply and pass into the cabinet, where they are connected with the terminals 33 and 34. A conductor 35 leads from the terminal 33 to a pressure limit switch 36 arranged on the tank and in communication therewith and a return conductor 37 leads from this switch to the motor 21 and a conductor 38 connects the motor with the terminal 34. Thus current will flow to the motor when the switch 36 is closed and said switch can be of any suitable type and acts to hold the pressure of air in the tank constant.

A switch 39, which may be of any desired type, but which is shown as a mercury one, is carried by a tiltable bracket 40 in the cabinet, and one terminal of this switch is connected by a conductor 41 with the terminal 33 and the other terminal of the switch is connected by a conductor 42 with a terminal of the solenoid 27, the other terminal of said solenoid being connected by a conductor 43 with a terminal of the solenoid of the assembly 28, and the second terminal of said solenoid assembly 28 is connected by a conductor 44 with the terminal 34. Thus when the bracket 40 is tilted to close the switch 39, current will flow through the switch, through the solenoid 27 to open the valve 26 and through the assembly 28 to close the valve of said assembly. When this is done, compressed air will flow from the tank through the pipe 22, valve casing 23 and pipe 24 and tube 25 into the bags 14 and expand the bags against the arm of the person using the machine.

Figure 9:
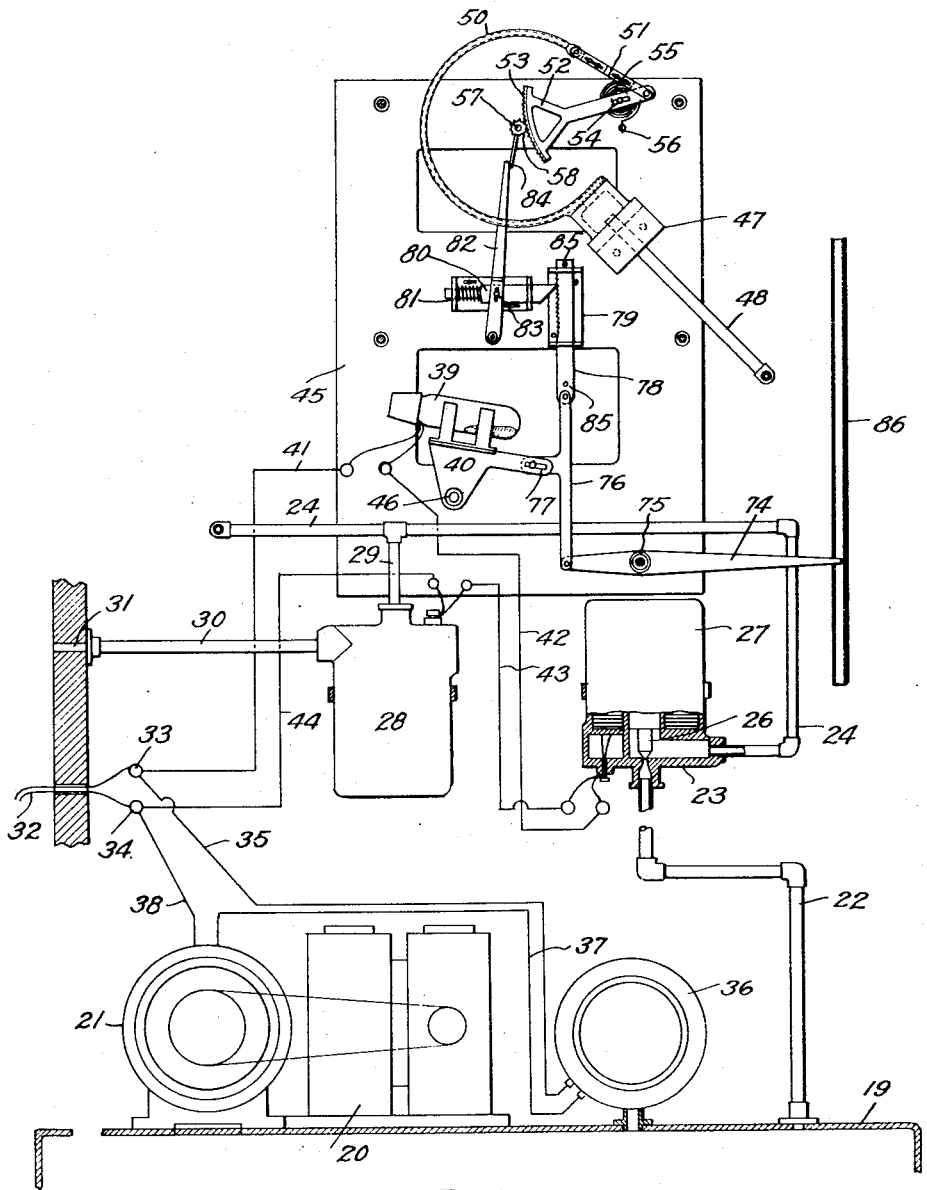
Figure 9 is a vertical sectional view of the structure of Figure 1 in a plane directly behind the front face of the casing.
Figure 10:
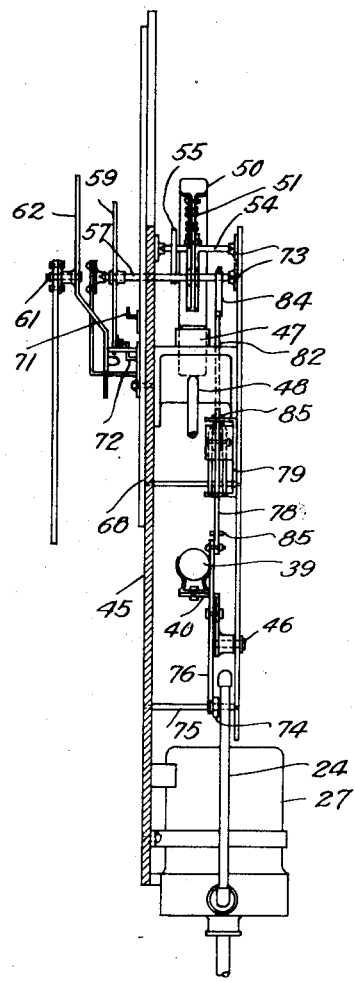
Figure 10 is a detail vertical sectional view taken in a vertical plane intermediate between the valve structures 27 and 28.
Figure 11:
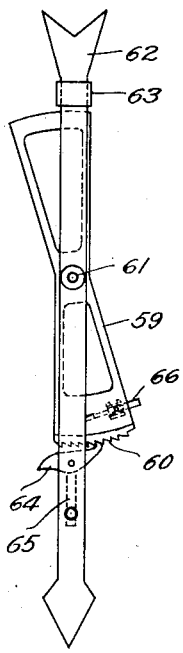
Figure 11 is a front elevational view of the indicator per se.
Figure 12:
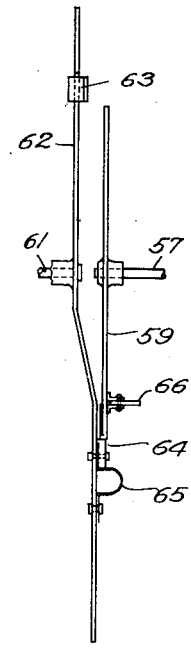
Figure 12 is a side or edge elevational view of the indicator.
Figure 13:
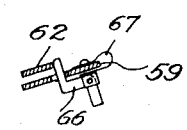
Figure 13 is a detail sectional view of the latch mechanism constituting a part of the indicator.

A frame, shown generally at 45, and composed of a number of spaced vertically arranged plates, is arranged in the top of the cabinet, and the bracket 40 is pivoted to this frame, as shown at 46. A casting 47 is supported from the frame and a pipe 48 connects the casting to a tube 49 which is connected with the bag 14 on the member 13 so that air will pass from the bags through the tube 49 and pipe 48 into the casting 47. A Bourdon tube 50 has one end attached to the casting and its other end is connected by a link 51 with the tail end of a segmental lever 52 which is formed with a segmental gear 53. The lever is carried by a shaft 54 journaled in the frame and one end of a coil spring 55 is fastened to the shaft and the other end of the spring is fastened to a pin 56 carried by the frame. The link 51 is an adjustable one, as shown in Figure 9.

A shaft 57 is journaled in the frame and carries a pinion 58 which meshes with the gear 53, and an elongated ratchet member 59 is fastened to the front end of the shaft 57 midway the ends of the member and said member has the ratchet teeth 60 at one end thereof. A pin 61 is carried by the frame in alignment with the shaft 57 and in front of said shaft and rotatably supports a finger 62 which is made in the form of an arrow, with a counter weight 63 on its rear part. A dog or pawl 64 is pivoted to the finger and is adapted to engage the teeth 60 of the member 59 and has a cam part which is engaged by a spring 65 on the finger so that said spring will hold the dog in either one of two positions. A toggle latch 66 is carried by the member 59, adjacent the toothed end thereof, and a spring 67 tends to hold the latch in either one of two positions. In one position of the latch, it will engage the finger and thus cause the finger to move with the member 59 and in the other position, it will be out of alignment with the finger.

A dial 68 is carried by the frame in rear of the window 3 which is covered by a transparent member 69 and the finger is arranged to move over said dial. The dial is graduated preferably from zero to 300° and projections 70, 71 and 72 are carried by the dial, the projection 70 being placed adjacent the zero mark of the scale and the projection 71 adjacent the other end of the scale, with the projection 72 arranged adjacent the projection 71. The projection 70 will move the latch 66 into a position where it will engage the finger 42, when the ratchet member 59 is at its starting point, and the projection 71 will move the latch 66 into releasing position when it is engaged by the depending part of the latch 66. The projection 72 will engage the tail end of the dog 64 to move the dog into engagement with the ratchet teeth 60, when the dog is brought into engagement with the projection.

The shafts 54 and 57 are preferably provided with jeweled bearings, as shown at 73.

A lever 74 is pivoted to the frame 45, as shown at 75, and one end of said lever is connected to a link 76 which has a part thereon connected to the bracket 40 by the pin and slot connection shown generally at 77, and the upper end of the link is pivoted to a rack bar 78 which is slidably supported by the bracket 79 attached to a part of the frame 45 and the teeth of this rack bar are engaged by the spring pressed dog 80 supported for sliding movement by the bracket 81 attached to the frame. These parts are so arranged that the rack bar can move upwardly, but is held against downward movement by the dog 80.

A forked lever 82 has its lower end pivoted to a part of the frame and this lever is connected with the dog 80 by the pin and slot connection 83 and the upper end of the lever is engaged by a projection or trip 84 on the shaft 57 when the shaft nears the end of its clockwise movement. When the lever is so moved by the trip, the dog 80 is moved out of engagement with the rack bar so that the parts can drop to their original position.

As will be seen, when the lever 74 has its major portion depressed, the link 76 and the rack bar are moved upwardly and this movement of the link will tilt the bracket 40 so as to close the switch 39, and, as the dog holds the rack bar in its upward movement, the switch will remain closed until the trip 84 strikes the lever 82 and releases the dog 80 from the rack bar, which will permit the parts to move downwardly and thus open the switch. The rack bar is limited in its movements by the pins 85 thereon engaging the bracket 79.

The lever 74 is tilted to close the switch by means of a coin dropped into the chute 86 into which the lever extends so that the weight of the coin will tilt the lever. The chute leads the coin into a box 87.

Thus it will be seen that when one wishes to test his blood pressure, he would step on the platform and after baring his arm, would place the same through the space formed by the bags 14 and then he would adjust the arm 11 to cause the bags to snugly fit around the upper part of his arm. He would then drop a coin of the proper denomination into the chute and this coin would tilt the lever 74, which in turn would raise the link 76 and the rack bar 78 and the dog 80 would hold the parts in this position. The raising of the link 76 would close the switch 39 so that current would flow into the solenoid 27, thus opening the valve 26, and current would also pass through the solenoid of the valve assembly 28 to close this valve. The opening of the valve 26 will permit air to flow from the tank through the pipes and tube 25 into the bags 14 and some of the air will pass from the bags through the tube 49 and pipe 48 into the casting 47 and from the casting, the air will pass into the Bourdon tube 50, thus causing the Bourdon tube to expand. The expansion of the tube will swing the lever 52 downwardly, thus causing the gear 53, engaging the pinion 58, to rotate the shaft 57 in a clockwise direction as viewed in Fig. 9 and as the latch 66 has been raised by its engagement with the projection 70, the clockwise movement of the member 59 will be imparted to the finger 62 by said latch so that the finger will move over the dial toward the maximum pressure end of the same. It is understood that the dog 64 is out of engagement with the ratchet teeth 60 on the member 59. When the parts reach the position adjacent the projection 71, said projection will engage the latch 66 so as to move said latch out of engagement with the finger and at about the same time, the dog 64 engages the projection 72, which moves the dog into engagement with the ratchet teeth 60 of the member 59 so that the finger is then attached to the member 30 by the dog. At this ime, the trip 84 engages the lever 82 and causes the lever to move the dog 80 out of engagement with the teeth of the rack bar 78, so that the bar, the link 76 and the lever 74 move to their normal positions and thus the bracket 40 is tilted to open the switch 39. The breaking of the circuit to the solenoid 27 causes the valve 26 to close and thus shut off the air to the arm members and the Bourdon tube and at the same time, the valve in assembly 28 opens so as to permit the air from the arm bags and Bourdon tube to slowly escape through the pipe 30 and the port 31. Thus the Bourdon tube will start to contract and this movement of the Bourdon tube and the action of the spring 55 will cause the shaft 54 and the lever 52 to move the shaft 57 in an anti-clockwise direction and as the dog 64 of the finger 62 is in engagement with a tooth 60 on the member 59, said finger will also be moved in an anti-clockwise direction. As soon as the pressure in the arm bags has been reduced to a degree to permit the pulsation of the blood pressure to act on the bags, said pulsation will cause a slight expansion of the Bourdon tube so that the shaft 57 is moved slightly in a clockwise direction, which will cause the tooth of the dog 64 to slide up the beveled part of a tooth 60 so that the spring 65 will move over the high part of the cam on the dog and thus cause the dog to release itself from the tooth of the member 59 and as the finger is then free of the member 59, it will stop while the other parts continue their anti-clockwise direction, due to the releasing of the air, until the said parts reach their normal position. As the member 59 reaches its normal position, the latch 66 will engage the projection 70 so that the latch will be moved into operative position and thus it will again engage the finger when another coin has been dropped into the chute and the parts are caused to operate again. Thus the person using the machine can tell what his blood pressure is by reading the degree mark at which the finger has stopped.

Figure 14:
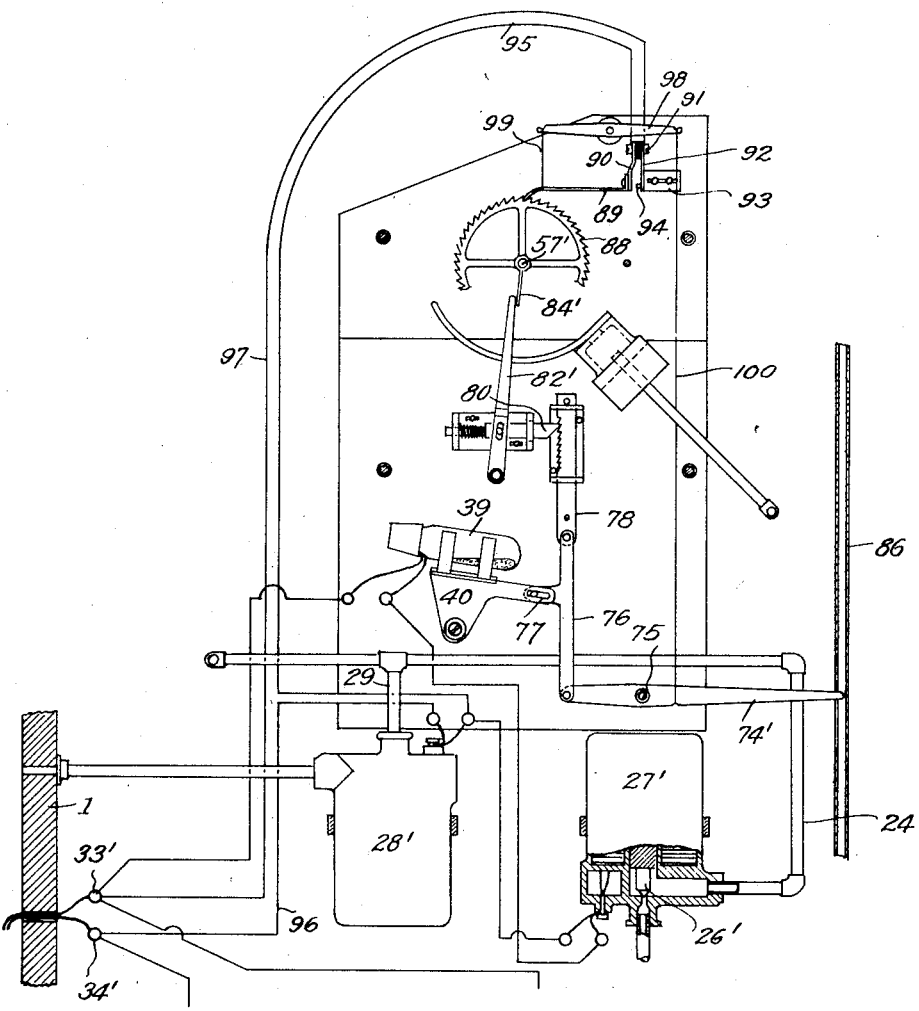
Figure 14 is a view similar to Figure 9 showing a modified form of the invention.

In the modification shown in Figure 14, the finger is connected directly to the shaft 57' and the ratchet member 59 and the projections 70, 71 and 72 are omitted. The finger or needle is a plain one, as the dog and its spring are omitted. A ratchet wheel 88 is fastened to the shaft 57' and a pawl 89 has its tooth adapted to engage the teeth of said wheel. This pawl is carried by a spring arm 90 insulated from its support 91 and parallels an arm 92, also connected with the support 91 and fastened to a bracket 93, the arm 92 carrying a contact 94 which is adapted to be engaged by the arm 90. A conductor 95 connects the arm 90 with a terminal of the solenoid 28', the other terminal of the solenoid being connected by a conductor 96 with the terminal 34'. A conductor 97 connects the terminal 33' with the arm 92, the parts being insulated so that the circuit is broken until the arm 90 engages the contact 94 and when this occurs, current will flow to the solenoid 28' so that the valve controlled by said solenoid will be closed and this circuit is such as not to affect the circuit to the solenoid 27', which controls the valve 26'. A lever 98 is located above the pawl 89 and is connected to the outer end of the pawl by the wire 99 and the opposite end of the lever is connected by a wire 100 with the coin operated lever 74'. Thus when a coin is dropped into the chute and the lever 74' is tilted thereby, the pull exerted upon the wire 100 will cause movement of the lever 98 so that said lever will lift the pawl 89 out of engagement with the ratchet 88 through means of the wire 99. The parts then operate as before described to move the finger in a clockwise direction to maximum pressure and when the trip 84' on the shaft 57' causes the lever 82' to release the dog from the ratchet bar, the supply of air to the arm bags and the Bourdon tube will be closed and the air released by the valve assembly 28' so that the parts will start to return to normal position. On the return of the lever 74' to its normal position, the wire 100 is slackened so that the lever 98 will permit the pawl 89 to engage the ratchet 88 and said pawl will simply ratchet over the wheel 88 as the said wheel moves in an anti-clockwise direction. However, just as soon as the first pulsation action of the blood reacts on the air pressure in the Bourdon tube, the wheel 88 is moved slightly in a clockwise direction and this movement causes the pawl 89 to move to the right so that the arm 90 will engage the contact 94 and thus close the circuit to the solenoid of the assembly 28' to cause the said solenoid to close the valve and thus stop further escape of air from the Bourdon tube. Thus the finger will stop at that mark on the dial which indicates the blood pressure of the person using the machine. This position of the parts is retained until another coin is inserted in the coin chute.

A hand operated valve 101, if desired, may be provided at the junction of the rubber tube 25 with the air pipe 24 so that after a person's blood pressure has been shown by the needle on the dial, the pressure on the arm bands may be released and the needle permitted to return to zero position.

When it is desired, the coin control feature may be eliminated and the lever 74 operated by hand. The invention, without the coin control feature, can be used by physicians, hospitals and wherever it is desired to use the machine without necessitating the dropping of a coin therein.

While the drawings show a finger cooperating with a dial, it will, of course, be understood that other indicating means may be used, such as a rotating cylinder and any other suitable form of indicating means.

While the drawings and specification illustrate and describe the invention used as a blood pressure measuring device, it is to be understood that the invention can be used for indicating the pressure of any pulsating fluid, such as that from a fluid pump, etc.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. In a machine of the character described a frame, an arm pivoted to the frame, a bar connected with the arm and slidable through the frame, means for fixing the bar with relation to the frame, opposed bags carried by the frame and arm respectively, tubes connecting said bags together and means for leading fluid under pressure into and away from one of the bags.

2. In a machine of the character described, a frame, a member carried by the frame and adjustable toward and away from the frame for selectively fixing its position with respect to the same, opposed bags carried by the frame and member respectively, flexible tubes connecting said bags together, and means for leading fluid pressure into and away from one of the bags.

3. A blood pressure indicating machine comprising a bag for application to an artery of a limb of the anatomy, an indicating device having a movable indicator, means connecting said bag and indicator to render said indicator responsive to pressure in the bag, means for supplying the bag with an elastic fluid under pressure to move the indicator to a maximum pressure, means for bleeding the bag, means for effecting operation of the supply means, means operative by said indicator when said maximum pressure is attained to cause said supply operating means to shut off said supply and to start operation of the bleeding means, and means connected with the indicator to effect stopping of the same when the indicator responds to recurring pressure in the artery of the limb engaged by the bag following the recession of the indicator due to the operation of the bleeding device.

4. A blood pressure indicating machine comprising a bag for application to an artery of a limb of the anatomy, an indicating device having a movable indicator, means connecting said bag and indicator to render said indicator responsive to pressure in the bag, means for supplying the bag with an elastic fluid under pressure until a predetermined maximum pressure is attained, means for bleeding the bag, means for automatically effecting operation of the bleeding means when said maximum pressure is reached to start recession of the indicator, and means to automatically stop said indicator during such recession in response to recurring pressure in the artery of the limb engaged by the bag.

5. A blood pressure indicating machine comprising a bag for application to an artery of a limb of the anatomy, an indicating device having a movable indicator, means connecting said bag and indicator to render said indicator responsive to pressure in the bag, means including an inlet valve for supplying the bag with an elastic fluid under pressure until a predetermined maximum pressure is attained, a normally open bleeding valve connected with the bag, operative connections between said bleeding and inlet valves to effect closure of the bleeding valve when the inlet valve is open, means for automatically effecting closure of the inlet valve when the said maximum pressure is reached whereby the bleeding valve is opened and recession of the indicator started, and means to automatically stop said indicator during such recession in response to recurring pressure in the artery of the limb engaged by the bag.

6. A blood pressure indicating machine comprising a bag for application to an artery of a limb of the anatomy, an indicating device having a movable indicator, means connecting said bag and indicator to render said indicator responsive to pressure in the bag, means including an inlet valve for supplying the bag with an elastic fluid under pressure until a predetermined maximum pressure is attained, a normally open bleeding valve connected with the bag, operative connections between said bleeding and inlet valves to effect closure of the bleeding valve when the inlet valve is open, means actuated by the indicator when at maximum pressure to close the inlet valve and open the bleeding valve to permit recession of the indicator from maximum pressure, and means to automatically stop said indicator during such recession in response to recurring pressure in the artery of the limb engaged by the bag.

7. A blood pressure indicating machine comprising a bag for application to an artery of a limb of the anatomy, an indicating device having a movable indicator and an independent movable member by which the indicator is actuated, means connecting said bag and said member to render the latter responsive to pressure in the bag, means for supplying the bag with an elastic fluid under pressure to move the member and with it the indicator to maximum pressure, means for bleeding the bag, means for effecting operation of the supply means, means operated by said member when maximum pressure is attained to cause said supply operating means to shut off said supply and to start operation of the bleeding means, and means connected with said member to release it from the indicator when the member responds to recurring pressure in the artery of the limb engaged by the bag following the recession of the member and indicator due to the operation of the bleeding device.

8. A blood pressure indicating machine comprising a bag for application to an artery of a limb of the anatomy, an indicating device comprising a movable member and an indicator operatively connected with the same for actuation thereby, means connecting said bag and member to render the latter and indicator responsive to pressure in the bag, means for supplying the bag with an elastic fluid under pressure to effect movement of the member to drive the indicator to maximum pressure, means for bleeding the bag, means for effecting operation of the supply means, means operated by said member when maximum pressure is attained to cause said supply operating means to shut off said supply and to start operation of the bleeding device, and an automatically actuated element coupling the indicator to said member during its recession when the bleeding means is operative, said element being automatically actuated to release the member from said indicator when the former responds to recurring pressure in the artery of the limb engaged by the bag.

JAMES F. PARKER, Jr.
JAMES L. PARKER.